United States Patent
O'Brien et al.

(10) Patent No.: US 6,905,564 B1
(45) Date of Patent: Jun. 14, 2005

(54) PROCESS FOR CREATING EXPANDABLE TIRE CHAMBER

(75) Inventors: John M. O'Brien, Tualatin, OR (US); Danny Robert Lewis, Oregon City, OR (US); Raymond Bryce Bushnell, Beaver Creek, OR (US); Charles Damon Olson, Portland, OR (US)

(73) Assignee: Power Cleat, Ltd., Las Vegas, NV (US)

( * ) Notice: Subject to any disclaimer, the term of this patent is extended or adjusted under 35 U.S.C. 154(b) by 548 days.

(21) Appl. No.: 09/652,997

(22) Filed: Aug. 31, 2000

Related U.S. Application Data

(63) Continuation-in-part of application No. 09/284,557, filed as application No. PCT/US97/19454 on Oct. 17, 1997, now Pat. No. 6,386,252, which is a continuation-in-part of application No. 08/909,302, filed on Aug. 11, 1997, now Pat. No. 5,810,451, which is a continuation-in-part of application No. 08/733,616, filed on Oct. 17, 1996, now Pat. No. 5,788,335.

(51) Int. Cl.[7] ............................................. B29D 30/06
(52) U.S. Cl. ....................... 156/114; 152/210; 156/123; 156/130
(58) Field of Search ................. 156/114, 123, 156/130, 110.1, 128.1, 129; 152/208, 210, 211, 212, 339.1–342.1, 167–169, 415; 137/231

(56) References Cited

U.S. PATENT DOCUMENTS

| | | | | |
|---|---|---|---|---|
| 1,298,661 A | * | 4/1919 | Case ....................... 152/339.1 |
| 2,237,559 A | * | 4/1941 | Jenne ......................... 137/231 |
| 2,841,199 A | * | 7/1958 | Voelkel et al. .............. 152/208 |
| 3,043,356 A | * | 7/1962 | Mayhercy .................... 152/208 |
| 3,712,336 A | * | 1/1973 | Bell, Jr. ....................... 137/231 |
| 3,930,528 A | * | 1/1976 | Harrington .................. 152/521 |
| 4,453,992 A | * | 6/1984 | Kuan et al. .................. 156/115 |
| 4,676,289 A | * | 6/1987 | Yi Su .......................... 152/210 |
| 4,815,513 A | * | 3/1989 | Hirakawa .................... 152/210 |
| 5,810,451 A | * | 9/1998 | O'Brien ....................... 152/210 |

FOREIGN PATENT DOCUMENTS

| | | | |
|---|---|---|---|
| JP | 57-144110 | * | 9/1982 |
| JP | 58-122207 | * | 7/1983 |
| JP | 11-216781 | * | 8/1999 |

* cited by examiner

*Primary Examiner*—Geoffrey L Knable
(74) *Attorney, Agent, or Firm*—Schwabe, Williamson & Wyatt, P.C.

(57) ABSTRACT

A process for producing a tire having an expandable chamber utilized for extending and retracting studs provided in the periphery of the tire. In one embodiment, a non-stick film is strategically positioned between the casing and the tread prior to curing the tread onto the casing. The interface at either side of the film forms the sides of an expandable chamber. The tread side of the chamber is inset and studs are affixed thereto. Expansion of the chamber extends the studs out of the inset and into engagement with a road surface. Alternative processes provide a channel in the tread and the expansion chamber formed in the channel.

4 Claims, 6 Drawing Sheets

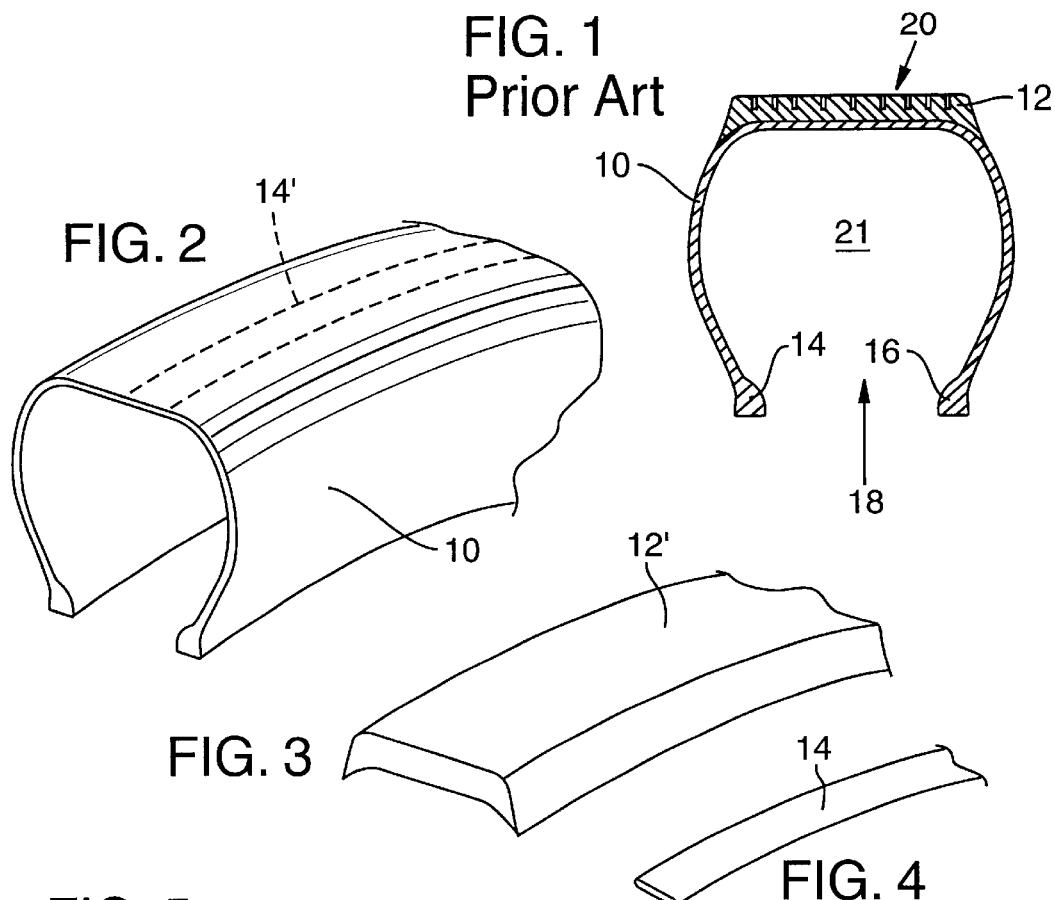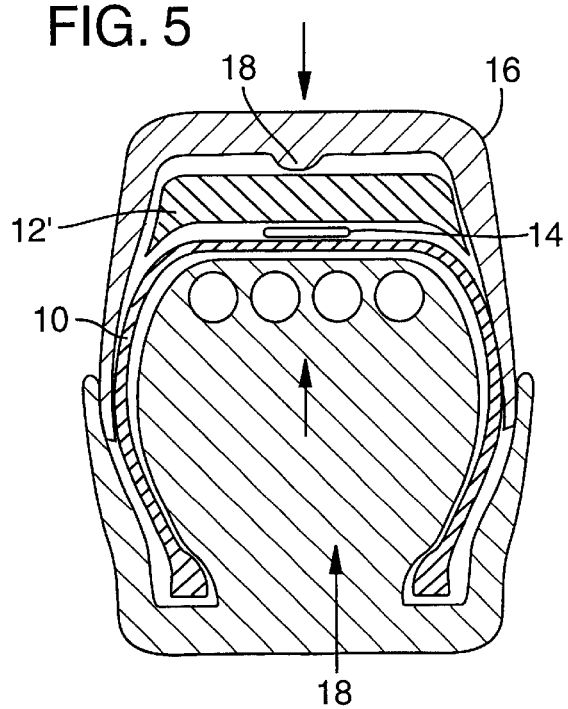

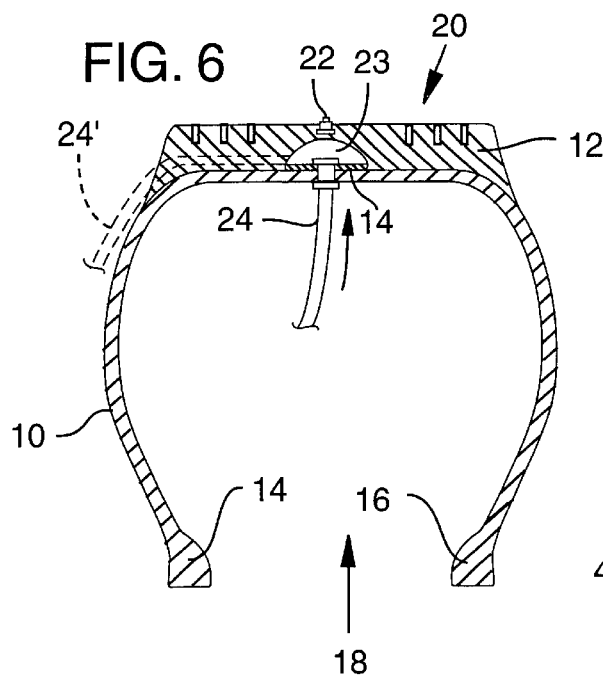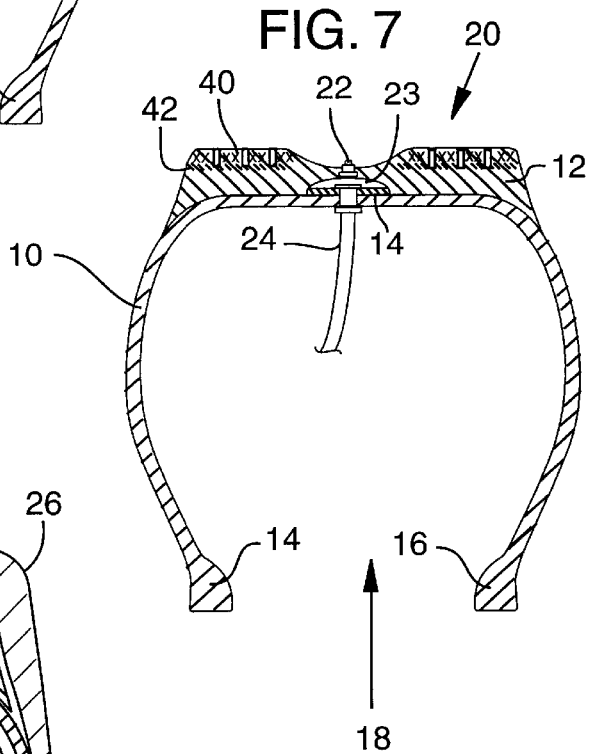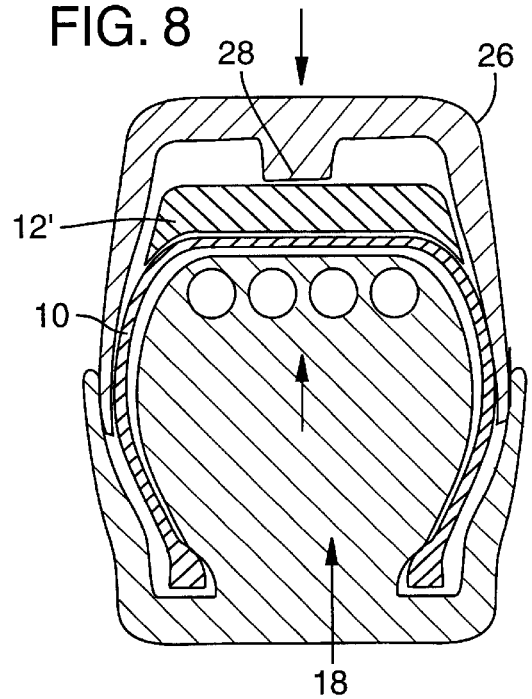

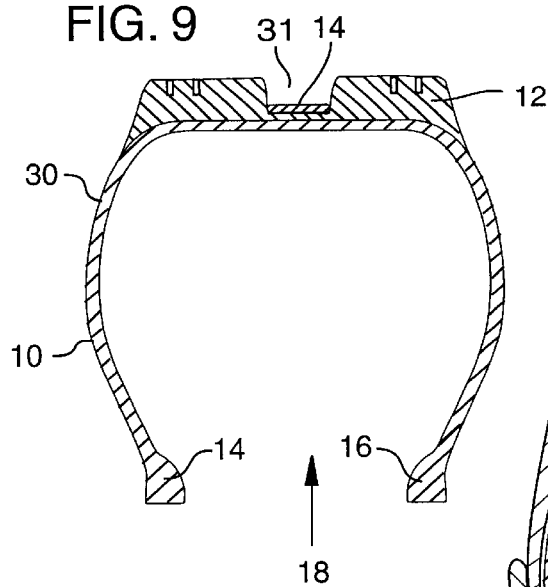
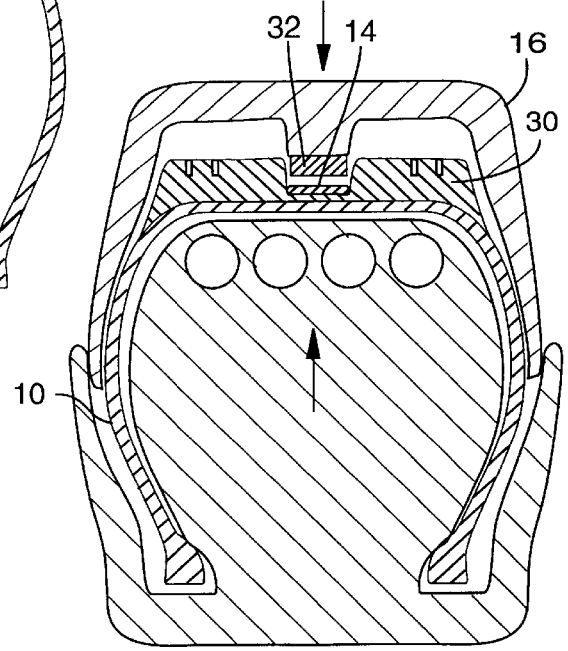
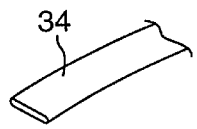 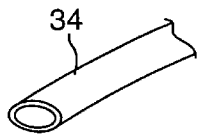
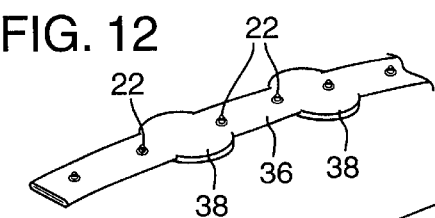
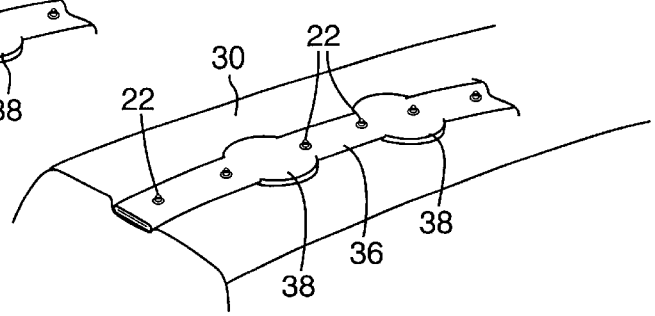

PROCESS FOR CREATING EXPANDABLE TIRE CHAMBER

This is a continuation-in-part of U.S. application Ser. No. 09/284,557 filed on Apr. 14, 1999, which was the National Stage of International Application No. PCT/US97/19454, filed Oct. 17, 1997, now U.S. Pat. No. 6,386,252; which is a continuation-in-part of U.S. application Ser. No. 08/909,302 filed on Aug. 11, 1997, now U.S. Pat. No. 5,810,451; which is a continuation-in-part of U.S. application Ser. No. 08/733,676 filed on Oct. 17, 1996, now U.S. Pat. No. 5,788,335.

FIELD OF THE INVENTION

This invention relates to a process for creating a secondary expandable chamber cooperatively arranged with an extendable portion of the tire tread to provide the means to induce independent engagement and disengagement of that portion with a road surface.

BACKGROUND OF THE INVENTION

This invention is a further development to the commonly owned inventions of U.S. Pat. Nos. 5,788,335 and 5,810,451, the disclosures of which are incorporated herein by reference.

Whereas the concept has been developed wherein a tire is provided with an efficient way to extend and retract a tread portion, e.g., carrying studs, the present invention is directed to a process for the efficient incorporation of that concept to state of the art vehicle tires.

Tires have undergone impressive development over the years. Fifty years ago a tire wasn't expected to last for much more than 10,000 miles of driving. Even then blow outs were common occurrences and such were considered a major hazard of driving. Today a blow out is almost unheard of and a set of tires can last in excess of 80,000 miles.

Reference is made to FIG. 1 which illustrates the structure of a state of the art tire. The tire consists of two parts which are referred to as the casing 10 and the tread 12. The casing is a continuous wall from a first bead 14 to an opposite bead 16 at the respective sides of the casing. The beads fit the tire rim (not shown) which closes off the inner opening 18. The casing is a composite of steel fibers and tough rubber and will withstand very substantial abuse.

The casing material is hard and will not adequately grip a roadway as necessary to achieve traction. That is the job of the tread 12. The tread is a relatively soft rubber that provides the desired grip. The tread is adhered to the casing by a molding process. The uncured rubber is laid inside a mold that is shaped to form the desired tread design. The casing is abutted against the uncured rubber and the molding apparatus applies pressure and heat to cure the rubber 12 and bond it securely to the casing. With the tire removed from the mold, the tread design has been permanently molded into the exterior face 20.

BRIEF DESCRIPTION OF A PREFERRED EMBODIMENT OF THE INVENTION

The invention provides for the formation of a secondary air chamber (the first chamber occupying the space 21 inside the casing 10). This secondary chamber is preferably formed at the interface between the casing and the tread. Studs may be imbedded in the portion of the tread that overlies the secondary air chamber and the tread thickness of that portion is reduced and inset into the tire tread so that the studs do not extend to the tread periphery. They are preferably inset to an extent that they do not extend to the tread periphery until 60 percent of the usable tread thickness is worn away.

The formation of the reduced thickness of the tread is formed by configuring the mold form to form an indentation in the tread face during the molding process. The secondary air chamber is formed by placing a non-adhering material such as tape, powder, liquid, e.g., in the form of a Teflon™ tape on the casing surface and surrounding the casing. When the tread rubber is bonded to the casing in the molding process, the portion of the casing and the rubber tread at either side of the Teflon™ tape are not bonded to either the tape or each other and thus provide a separation that forms the chamber. The reduced thickness of tread overlies the tape and thus the secondary chamber.

Air pumped into the chamber extends the tread overlying the chamber outwardly to the tread periphery. Studs can be imbedded in the reduced thickness tread and an air valve extended into the secondary chamber to controllably expand and contract the chamber. (The resiliency of the rubber induces retraction when the air pressure to the chamber is depleted.) Alternately the extendable tread in a non-extended state may be non-studded and function as a water trough on wet roads and extended for greater surface gripping on dry roads.

Whereas the above is a preferred design, the procedure can be accomplished by first forming an indentation whereby the bottom of the indentation forms the inside wall of the chamber. A Teflon™ tape can be laid in the indentation and a secondary tread forming process applied to bond a strip of rubber to the walls of the indentation overlying the Teflon™ strip.

A process can also be used which provides for a tube to be laid in the indentation and the secondary rubber layer bonded over the tube. The tube can also be suitable as the center tread portion having studs imbedded in the tube. The elasticity of the tube assures secure gripping of the tube to the tread at the indentations. This eliminates the secondary molding process.

Each of the above processes has benefits and disadvantages which will become apparent upon reference to the following detailed description having reference to the accompanying drawings.

BRIEF DESCRIPTION OF THE DRAWINGS

FIG. 1 is a schematic illustration of a state of the art tire to which the invention is applied;

FIG. 2 is an illustration of a casing such as used in the tire of FIG. 1;

FIG. 3 is a schematic illustration of an uncured rubber section such as used to form a tire tread on the casing of FIG. 2;

FIG. 4 is a schematic illustration of a strip of non-adhesive film or strip such as Teflon™ tape;

FIG. 5 is a schematic illustration of a molding process for molding the components of FIGS. 2–4 into a tire in accordance with the present invention;

FIG. 6 is a schematic illustration of the step of inserting studs into a tire formed in the molding process of FIG. 5;

FIG. 7 is a schematic illustration of a tire produced from the process of FIGS. 5 and 6 in accordance with the present invention;

FIG. 8 is a schematic illustration of an alternative molding process including a first step thereof;

FIG. 9 is an illustration of a second step in the alternative process of FIG. 8;

FIG. 10 is an illustration of a third step in the alternative process of FIGS. 8 and 9;

FIGS. 11A and 11B are illustrations of a deflated and inflated collapsible tube to be used in a second alternative process;

FIG. 12 is an illustration of a deflated, collapsible, inflatable tube to be used in a third alternative process;

FIG. 13 is a schematic illustration of a tire produced with the collapsible/inflatable tube of FIG. 12.

DETAILED DESCRIPTION OF THE PREFERRED EMBODIMENT

Figure 14:
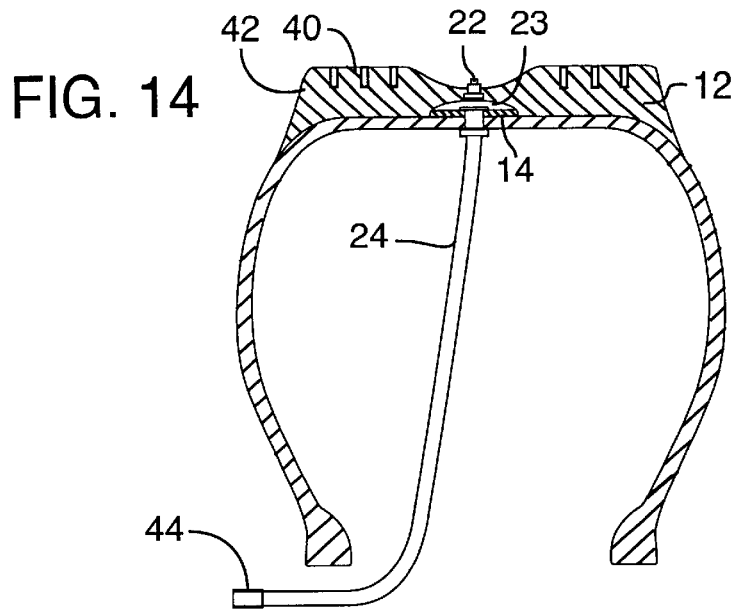
FIGS. 14–16 illustrate an example for providing expansion and contraction of the air chamber created by the process of the invention.

With reference to FIGS. 1–7, illustrated in FIG. 1 is a state of the art tire having a steel reinforced casing 10 on which is bonded, by curing, a tire tread 12. The casing 10 and uncured tread rubber segment 12' are illustrated in FIGS. 2 and 3. FIG. 4 illustrates a non-adhering adhesive strip, e.g., Teflon™ tape 14 which is used in the illustrated process of FIGS. 1–7.

The process is substantially illustrated in FIG. 5. The mold form 16 is modified by the inclusion of an indentation forming boss 18. The strip 14 is positioned around the casing periphery as indicated by dash lines in FIG. 2 and the uncured rubber segment 12' is placed on the casing, e.g., by extrusion. The casing 10, strips 14 and uncured rubber segment 12' are then inserted into the mold form 16 as illustrated in FIG. 5. A plunger portion 18 of the molding apparatus is then inserted into the mold form behind the casing 10 and suitable heat and pressure (indicated by arrows) are applied to cause a curing of the tread rubber 12' and thereby a bonding of the cured tread rubber 12 to the casing 10 except at the interface wherein resides the strip 14. Neither the rubber or the casing is bonded to the strip (although should it bond to one or the other, the invention would not be affected and it may even be desirable to provide bonding of the strip to the casing prior to the curing process to insure that the strip is maintained in place). It may be desirable that the rubber segment over the strip 14 have a different foundation, i.e., diameter which is readily provided in the extrusion process.

Following removal of the tire from the mold form, studs are inserted (if desired) in the reduced section of the tread (over the chamber 23) and a valve and line 24 are inserted into the chamber 23 (See FIG. 6). Although shown to be inserted from the inside, i.e., through chamber 18, it is contemplated that an alternative valve and line 24' could be inserted from the side of the tread, e.g., external of the chamber 18 as illustrated in dash lines in FIG. 6. FIG. 7 illustrates the completed tire of the invention.

FIGS. 8–10 illustrate a first alternative embodiment of the invention. In FIG. 8, an indentation is formed into the uncured tread tire segment 12 by boss 28 of mold form 26 that is likely deeper than illustrated for FIG. 5. This forms a tire 30 having indentation 31 as shown in FIG. 9. The strip 14 of FIG. 4 is placed in the indentation 31 and as illustrated in FIG. 10, a further molding process is initiated whereby an uncured tread rubber segment 32 is placed over the strip 14 and a following cure step cures and bonds the rubber 32 to the case 10 of tire 30 to again form the collapsible chamber similar to that of FIG. 7 but within the tire tread and not at the interface of the tire tread and casing.

FIGS. 11A and 11B illustrate an inflatable tube 34 in a deflated state and inflated state, respectively. Such a tube can replace the strip 14 in the process of either FIG. 5 or 10.

FIGS. 12 and 13 illustrate a further variation. FIG. 12 illustrates a tube 36 that is sufficiently tough to carry studs 22 and withstand direct exposure to the roadway. With reference to FIG. 9, the strip 14 can be replaced by tube 36. It is a full circular tube and is seated in the indentation 31 of the tire tread. It may be desirable to provide lobes 38 for the tube and lobe forms for the tire tread at the sides of the indentation 31. Such would prevent the tubes from sliding around the tire. A valve and line such as illustrated in dash lines at 24' in FIG. 6 may be preferable for this alternative tire. Also, it will be appreciated that the tube may preferably be constructed to have highly resistive elasticity for securing the tube in the indentation.

With reference to FIG. 7, it will be appreciated that the air input 24 can be provided from an external source. However, for the preferred embodiment it has been established that a most convenient source for the air pressure for the chamber 23 is from the air pressure available from the main tire chamber 21. The air consumed by filling the chamber 23 is negligible as compared to the air source of the main tire chamber. Thus, a valve system that expands chamber 23 from air pressure in tire chamber 21 and exhausts the air from chamber 23 to atmosphere will allow for dozens of cycles with no noticeable affect on the tire inflation. Such a valving system is illustrated in FIGS. 14–16.

Figure 15:
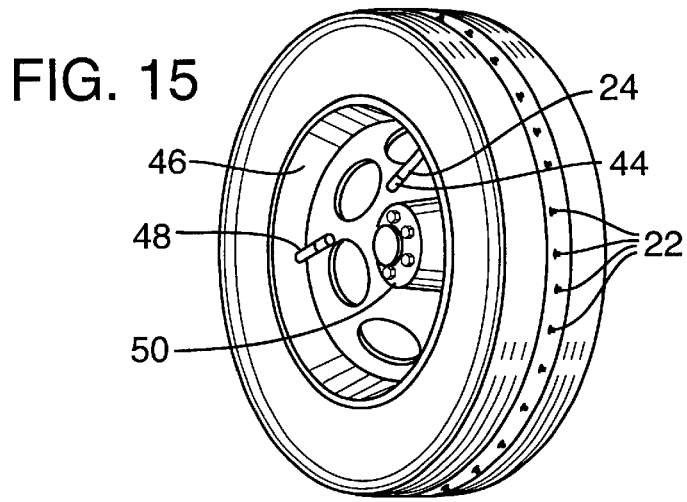

FIG. 14 is similar to FIG. 7 and illustrates air transfer line 24 and valve stem 44 extending from chamber 23 and through a wheel rim 46. (See FIG. 15) In FIG. 15, valve stem 48 is the main tire valve stem and 50 indicates a wheel hub.

Figure 16:
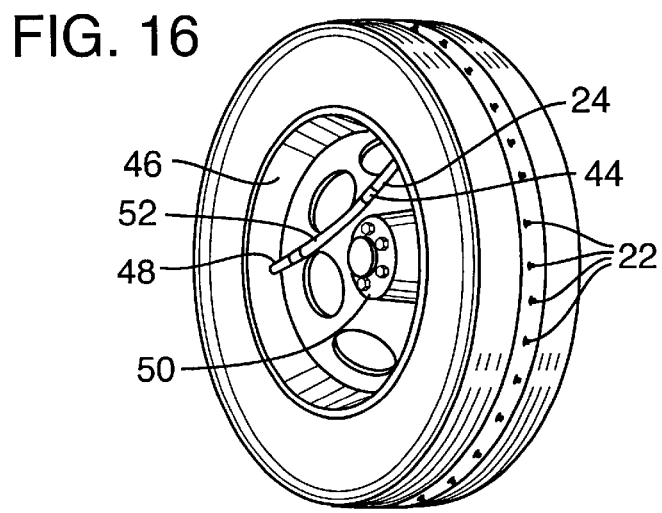

FIG. 16 illustrates stem 44 connected by air transfer hose 52 to main tire valve stem 48. When the two chambers are connected in such manner, air pressure is equalized between the two chambers and expansion of chamber 23 is accomplished. When the air transfer hose is disconnected from valve stem 44, the air pressure in chamber 23 is exhausted to atmosphere through valve stem 44 due to the memory of the chamber and the chamber returns to its non-expanded condition. In the alternative, the air hose 52 can be regulated to allow only a portion of the main tire pressure to move into expandable chamber 23, should main tire air pressure be greater than needed to expand expandable chamber 23. A variety of methods to connect the two chambers for the purpose of expanding chamber 23 can be constructed, the air transfer hose being the simplest to illustrate.

Figure 17:
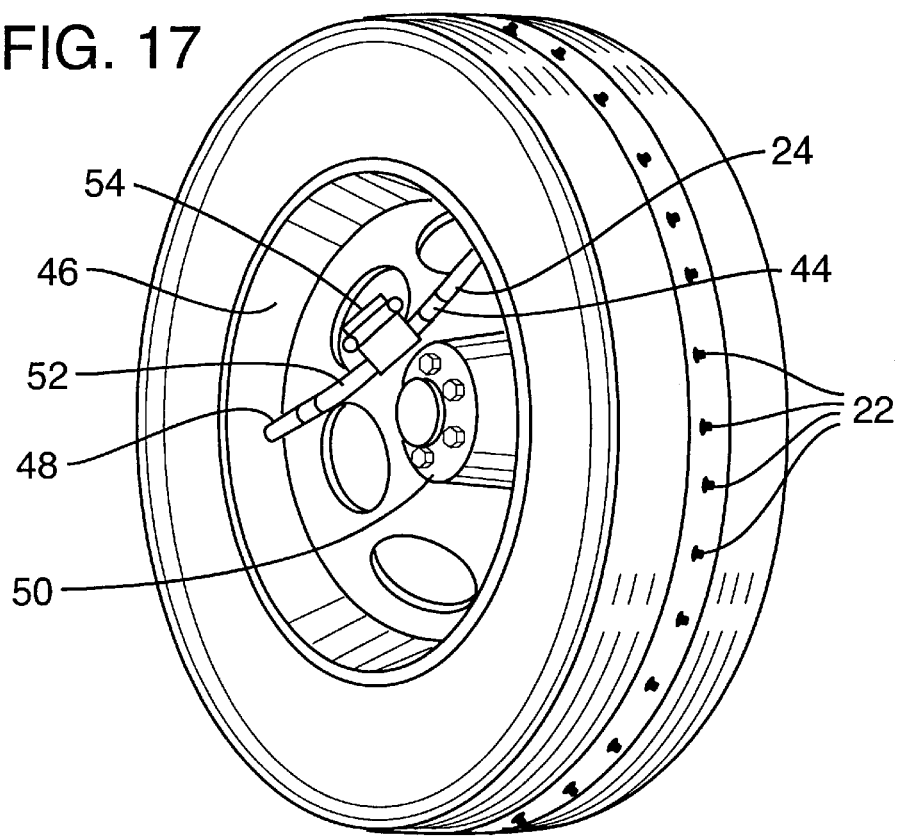
FIGS. 17–19 illustrate further examples of mechanisms for expansion and contraction of the air chamber.

FIG. 17 illustrates the insertion of a pump 54 connected to the air transfer system (in this case connected to hose 52). The pump can be used (1) to help extract additional air pressure from the tire chamber (or an alternative bellows chamber used for the storing of air) if needed by the expandable chamber 23, (2) assist in equalization of tire chamber pressure and expandable chamber pressure and (3) extraction of air from the expandable chamber back to the tire or alternative bellows storage unit. This pump allows for the air system to be self-contained without the need to exhaust the air to atmosphere or import air from some exterior tank or other source to inflate either the tire chamber or the expandable chamber.

Figure 18:
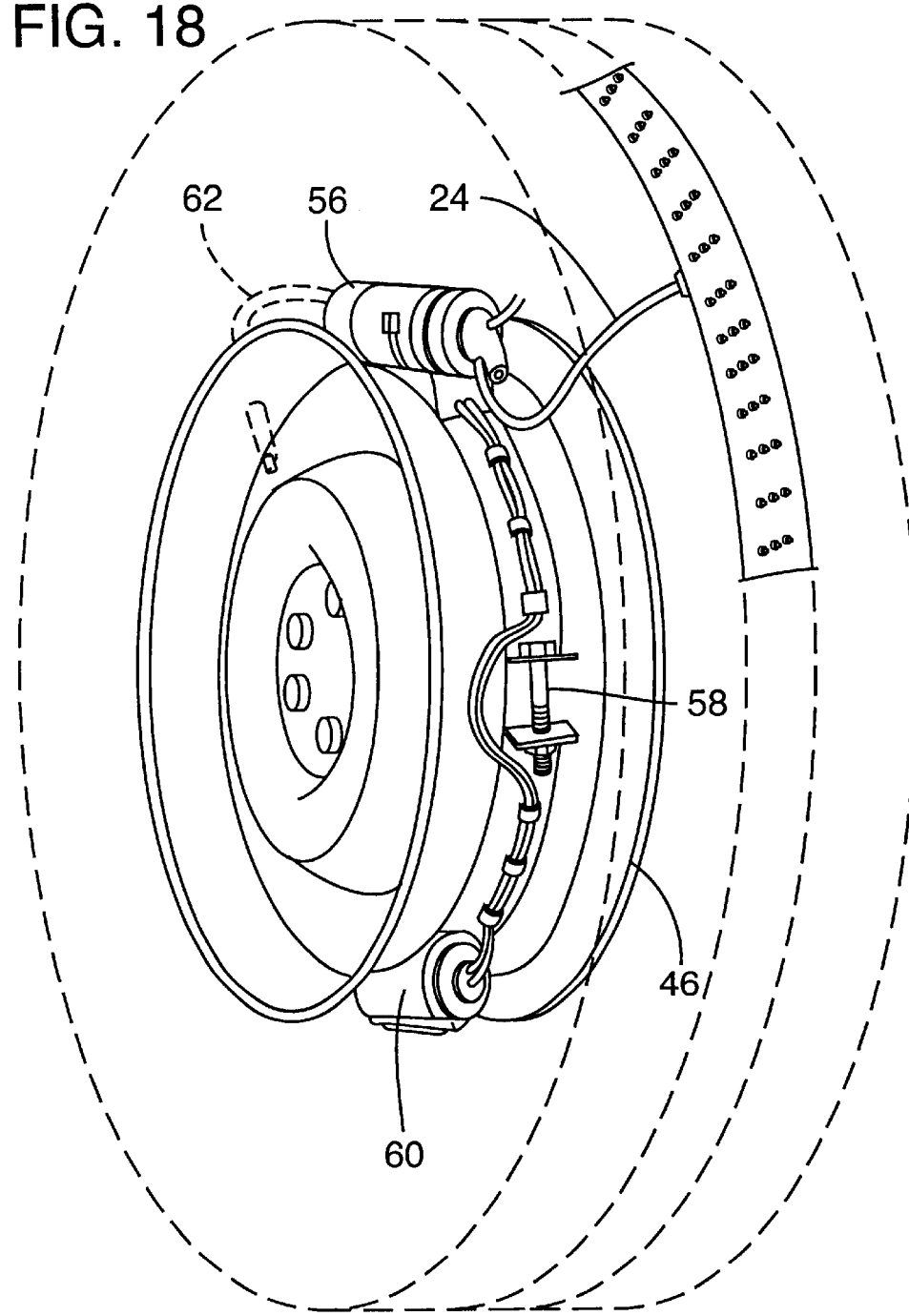

FIG. 18, in the alternative, illustrates a mechanical bellows 56 capable of holding enough air to fully expand the expandable chamber 23 for expansion and remove the air for deflation, without need of using the air pressure contained within the main tire. This system also allows for the air system to be self-contained without the need to exhaust air to atmosphere or import air from some exterior tank, the tire chamber or other source. The bellows can be mounted in an interior position within the tire chamber and on top of the wheel rim 46 as illustrated where the bellows 56 is strapped around the wheel rim 46 with an adjustment 58 making installation on any size wheel possible. A power supply battery pack 60 is mounted opposite the bellows 56 to balance the wheel.

Illustrated in dash lines in FIG. 18 is an exterior valve and tube 62 installed to allow import of exterior air. The bellows 56 can then be used as an air pump to supply air pressure to the tire chamber through exhausting pressurized air from bellows 56. In this iteration a second valve equipped with a venturi filter is placed within the bellows 56 to selectively allow for pressure to be transferred to tire chamber 21 or to expandable chamber 23.

Figure 19:
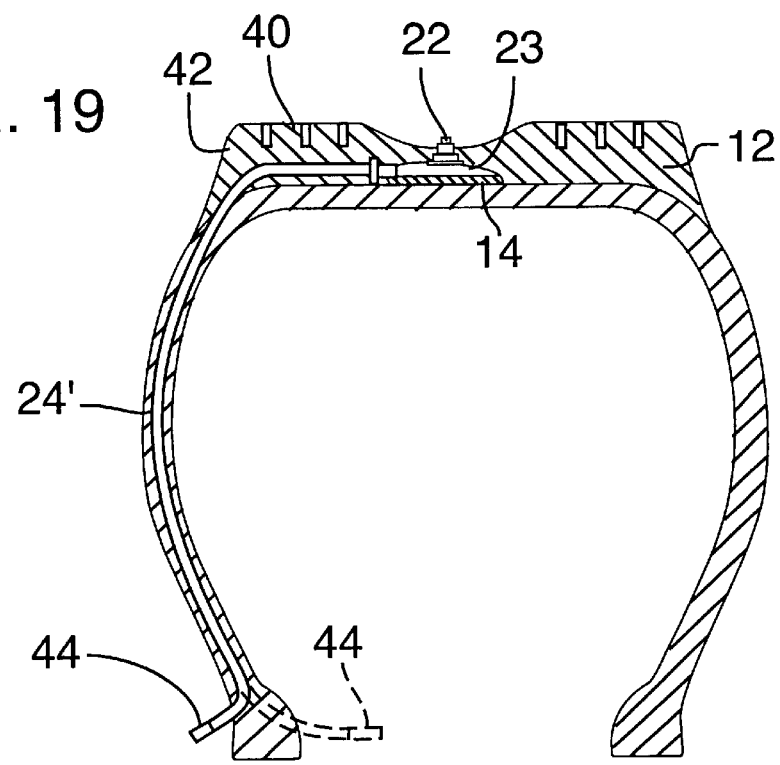

FIG. 19 illustrates an alternative method by which valve stem tube 24' does not pass through the tire casing but is implanted within the tire tread and the outer rubber on the casing wall and exits exteriorly from the side wall prior to the bead segment of the casing. In the alternative, the valve stem 44 exits into the main tire chamber (shown in dash line).

A further variation is the color coding of the tread 12. As indicated by cross hatching in FIG. 7, the tread may be colored one color, e.g., green, (cross hatching 40) to indicate acceptable remaining wear life. When approaching the 60 degree wear life whereat the non-extended studs will be exposed, the color orange or yellow, indicated by cross hatching 42, will start showing at the tread surface. A third color, e.g., red, could indicate that the wear life has been expended.

The above are but a few variations of the invention herein contemplated and those skilled in the art will appreciate the numerous modifications and variations that are possible and such modifications and variations are encompassed by the invention as claimed in the appended claims.

The invention claimed is:

1. A process for creating controlled extension and retraction of a tire tread segment in a vehicle tire which comprises:
   providing a tire including a casing of steel and rubber having an outer peripheral surface and a tread secured to said peripheral surface and defining a ground engaging surface;
   forming a channel in the tread with side walls and a bottom wall, the bottom wall of the channel inset from the ground engaging surface;
   laying a non-adhering film on the bottom wall;
   laying an uncured rubber layer over the film within the channel, said layer having an outer surface inset from the ground engaging surface of the tread;
   curing the rubber and thereby bonding the rubber layer to the walls of the channel, the film preventing bonding of the rubber layer to the bottom wall to thereby form an expandable chamber between the layer and the bottom wall with the rubber layer then providing a continuation of the tread across the channel; and
   providing a controlled air inlet to the chamber for extension and retraction of the chamber for selective extension and retraction of the tread segment from the channel.

2. A process as defined in claim 1 which includes inserting studs into said tread segment.

3. A process for creating controlled extension and retraction of a tire tread segment in a vehicle tire which comprises:
   providing a tire including a casing of steel and rubber having an outer peripheral surface and a tread secured to said peripheral surface and defining a ground engaging surface;
   forming a channel in the tread with side walls and a bottom wall, the bottom wall of the channel inset from the ground engaging surface;
   laying an endless deflatable, inflatable tube on said bottom wall;
   laying an uncured rubber layer over the tube within the channel, said layer having an outer surface inset from the ground engaging surface of the tread;
   curing the rubber layer and thereby bonding the layer to the walls of the channel, the tube preventing bonding of the rubber layer to the bottom wall, the tube forming an expandable chamber between the layer and the bottom wall; and
   providing a controlled air inlet to the chamber for extension and retraction of the layer for selective extension and retraction of the tread segment from the channel.

4. A process as defined in claim 3 which includes inserting studs into the tread segment.

\* \* \* \* \*